United States Patent Office 3,045,957
Patented July 24, 1962

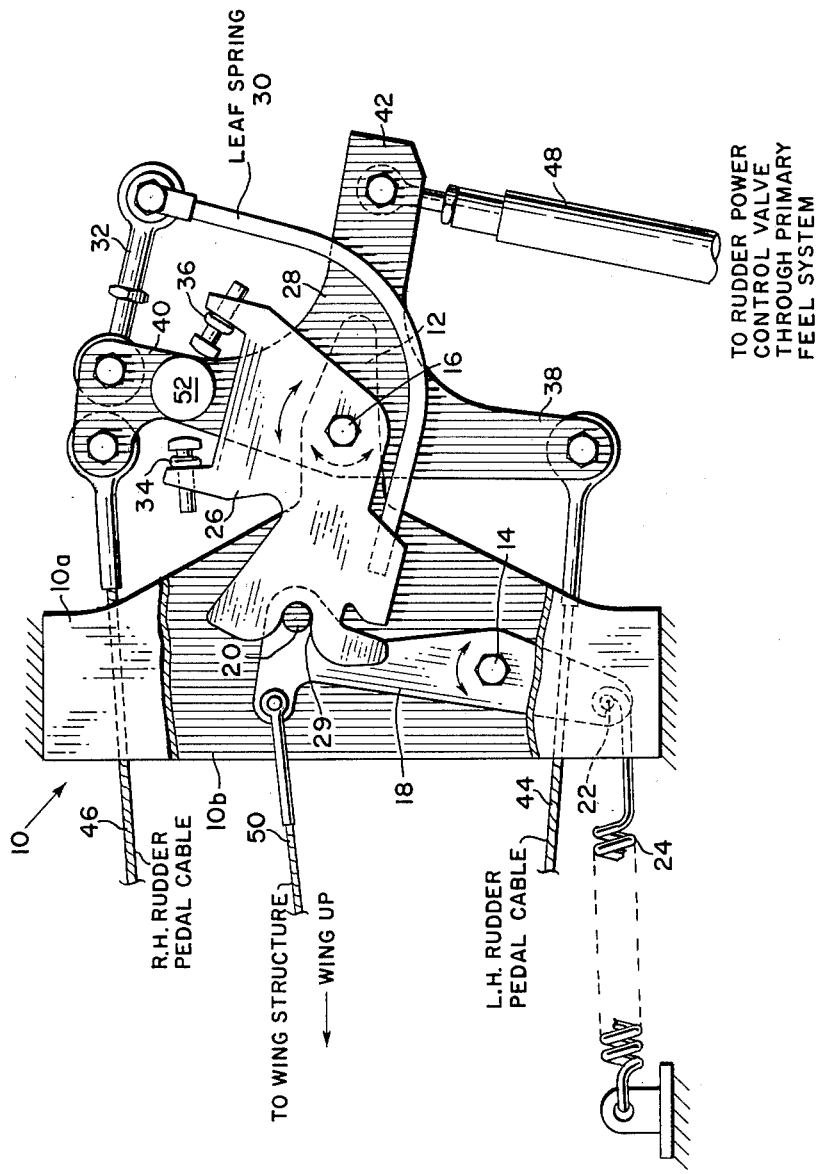

3,045,957
AUXILIARY FEEL SYSTEM
William C. Boyce and Richard M. Johnson, Dallas, Tex., assignors, by mesne assignments, to the United States of America as represented by the Secretary of the Navy
Filed Nov. 21, 1960, Ser. No. 70,876
7 Claims. (Cl. 244—83)

The present invention relates to flight control systems for aircraft provided with power-operated airfoils, and, more particularly, to improved means for developing and applying synthetic or artificial feedback forces to the control stick or rudder pedals in the pilot's compartment of such an aircraft.

In early aircraft designs, most, if not all, of the flight control surfaces were connected to the pilot's control lever or "stick" by a direct mechanical linkage. In that era when aircraft moved at relatively low speeds the pilot was consequently able to vary the position of an airfoil by applying a direct force to this mechanical linkage. However, since aircraft speeds have so greatly increased, the pressure developed on each airfoil member may reach such high magnitude that excessive manual effort would be required to cause a movement thereof under many operating conditions. Consequently, modern aircraft are almost universally equipped with power control systems, wherein the force required to be exerted by the pilot is extremely small as compared to the power required to actually change the position of the airfoil. In other words, the pilot is only required to produce a control variation, which is translated by the power mechanism into a proportional airfoil displacement. In summary, therefore, modern aircraft incorporate apparatus which permits the pilot to develop a control signal indicative of a desired airfoil position, this signal acting to operate the power-generating apparatus per se.

Although such a full-power system obviously reduces the required control stick forces, it has the further effect of completely eliminating all feedback to the control stick from the airfoil or other attitude-control surface to which the control stick is connected. Consequently, the pilot of the aircraft receives no indication of the position of the airfoil at any given instant of time, or of the load imposed on the aircraft as represented by pressure on the airfoil surface. One undesirable result of such an arrangement is that the pilot is enabled to call for a movement of the airfoil which would place an excessive and possibly dangerous aerodynamic load on the aircraft, especially when the latter is traveling at a high speed.

To return to the pilot an awareness of airfoil position at any instant of time, various devices have been developed for producing a so-called "feel" which varies in magnitude as a function of airfoil displacement. One means of achieving this "feel" is to introduce into the control system a control stick force derived from the dynamic pressure of the air stream flowing over the aircraft fuselage. Other systems incorporate an adjustable element in the linkage mechanism, a variation in the length of this element acting to change the positional relationship between the control column and the restoring force-producing apparatus. Expedients such as the above have proven to be satisfactory in varying degrees, but they have tended to be excessively complex so that considerable friction is developed within the control system itself. Furthermore, they have added materially to the weight of the aircraft with a consequent reduction in its maximum attainable speed.

In Patent #2,881,631, issued April 14, 1959, to M. V. Riccius there is set forth a so-called artificial feel mechanism which is responsive to a movement of the linkage connected to a pilot's control element away from its neutral position to urge the return of this linkage, and hence of the control element, to neutral position with a force increasing in direct proportion to the amplitude of displacement of the linkage. In a preferred embodiment of the invention shown in this patent, first and second members are movably mounted on an aircraft and each of these movable members has a respective neutral position from which it is movable in only one direction. Thus, the first movable member is actuatable from neutral in a first direction, while corresponding actuation of the second movable member can only take place in another, second, direction. These motions of the respective movable members are reversible, and a plurality of stops are provided to prevent reverse rotation of the two members beyond their respective neutral positions. A resilient member is connected between the first and second members for resisting any movement of either member from a neutral position with a force that increases in proportion to the amplitude of the movement. A linkage mechanism connects the pilot's control stick of the aircraft in which the invention device is installed to a power-control unit which performs the actual positioning of the airfoil or other aerodynamic surface.

The first and second movable members of the patented apparatus described above may take the form of a first pair of idlers, pivotally mounted on the aircraft and joined at their otherwise free ends by the resilient means. One of these idlers may be arranged so that it has a surface portion which bears against one of the two movable members when the linkage is actuated in a particular direction from its neutral position, and the other idler may similarly be arranged relative to the other movable member. In cases where the mechanical advantage derived from the linkage in displacing the first movable member from its neutral position is the same as when similarly displacing a second movable member, the feel force gradients experienced when the control element or stick is moved to either side of neutral will be the same. On the other hand, when this mechanical advantage is changed so that it is greater when moving the linkage in one rather than in the other direction, the feel force gradients in the two directions will be unequal.

It will be recognized that the artificial feel force transmitted to the pilot of an aircraft by means of the apparatus disclosed in the above-mentioned Riccius patent is continuously present and does not take into account certain operations which are carried out during flight of the aircraft. For example, it has been determined that the introduction of such feel forces are neither necessary nor desirable during landing or take-off operations, and that these forces should accordingly be present during normal flight. Furthermore, the feel force introduced by such devices is essentially linear in a sense that incremental changes in this force are a function solely of control stick movement. It has been found in practice that the feel force thus introduced preferably should be changed not in a strictly linear manner but rather as a function of the aircraft's speed.

In accordance with a preferred embodiment of the present invention, there is provided an auxiliary, or supplemental, mechanism for modifying the gradient of the pilot's feel curve and surface throw for different speed conditions of the aircraft. The apparatus disclosed herein is thus intended to be utilized in conjunction with a so-called "primary" feel system such as that shown, for example, in the above-mentioned Riccius patent. In addition to providing the aircraft pilot with a more accurate "sensing" of airfoil position at all times, the system of the present disclosure incorporates means for excluding or "cutting out" these additional feel forces while the aircraft is engaged in taking off or during a landing operation. The latter result is obtained automatically as a function of a change in the position of the aircraft wing in moving from flight position to that in which it is located during such a take-off or landing.

One object of the present invention, therefore, is to provide an improved mechanism for simulating and applying artificial feel, or feedback, forces to the pilot's control stick of an aircraft incorporating power-actuated airfoils.

Another object of the invention is to provide a so-called feel device the function of which is to supplement the action of conventional feedback mechanisms by augmenting the force transmitted to the pilot of an aircraft so that he will be at all times aware of the position of that particular airfoil with which the feel apparatus is associated.

A still further object of the invention is to incorporate, in an aircraft provided with power-operated airfoils, a supplemental feel structure which is effective during normal aircraft flight but that is cut out, or rendered ineffective, when the aircraft on which the device is installed engages in a take-off or landing operation.

Other objects and many of the attendant advantages of this invention will be readily appreciated as the same become better understood by reference to the following detailed description when considered in connection with the accompanying drawing, the single FIGURE of which is a view partly in section of an aircraft feel system designed in accordance with a preferred embodiment of the present invention.

It has been mentioned above that the present concept is directed to aircraft intended for relatively high-speed operation, wherein the aileron-control apparatus normally takes the form of a servo system having as one of its components a cylinder the piston of which is actuated by a flow of hydraulic fluid into and out of the cylinder, this flow being under the direct control of the aircraft pilot. One example of a system of this nature (as applied to a rudder-control assembly) consists primarily of conventional rudder pedals, a combination control-cable and pushrod connecting system, a rudder-control surface, and a hydraulic power-control package to drive the surface. Movement of the rudder pedals introduces a corresponding motion into the cable system, which in turn is transmitted to the pushrods and thence to the power-control package slider valves. The latter are mechanically positioned to direct hydraulic pressure to the power-control cylinder. Movement of this cylinder is then transmitted through a mechanical linkage to the control surface, which is accordingly positioned to correspond to a right or left rudder pedal actuation. A control system of this nature is frequently incorporated into an aircraft having a variable-incidence wing, which is maintained in one of two positions during normal flight (its "clean" condition) and in the other of its two positions during a take-off or landing operation.

In aircraft of the general type above discussed, a spring may be installed in the rudder pushrod system to provide the pilot with a simulated "feel" at the rudder pedals by furnishing an opposing force proportional to the pedal displacement from neutral. One such spring assembly is described in the mentioned Riccius patent. With such an arrangement, the pedals will return to neutral when depressed and then released. In operation, when a rudder-left signal is transmitted to the control system, the feel spring remains fixed at one end while the other end moves with the pushrods. When a rudder-right signal is introduced, operation of the spring is reversed.

In accordance with a preferred embodiment of the present invention, an assembly of the above type has added thereto an auxiliary structure having as a principal component thereof a second spring the tension of which, when the wing is in "clean" condition, adds to the force of the main feel spring, and is similarly transmitted through the mechanical linkage to the rudder pedals in proportion to the distance the pedals are displaced. This auxiliary assembly of the present invention also incorporates a pair of stops the function of which is to limit linkage movement (and hence the displacement of the rudder) during normal aircraft flight to a predetermined maximum value. The design of this structure is such that the limitation on rudder travel is removed automatically when the aircraft takes off or lands (due to an interrelationship of the invention structure with the aircraft wing) so that a variation of wing incidence changes the operative status of the limiting mechanism. Before proceeding with a detailed description of a preferred embodiment of the present invention, it should be emphasized that the structure herein set forth is to be employed in conjunction with an aircraft primary feel system of the type set forth, for example, in the above-mentioned Riccius patent. In the interest of clarity, only those components which constitute applicants' inventive concept per se have been illustrated and described herein, and no discussion of the remaining conventional aircraft structure will be presented.

Referring now to the single figure of the drawing, there is illustrated a support member generally identified by the reference numeral 10. This support member 10 is mounted on some rigid portion of the aircraft structure so as to remain fixed in position with respect thereto. Preferably, member 10 is made up of a pair of plates formed as a unit so that they lie essentially in spaced-apart parallel relation. To facilitate an understanding of the manner in which the remaining components are associated with the support member 10, the upper (in the drawing) plate 10a is illustrated as being partly broken away so as to more clearly bring out the design and function of those members lying between this plate and its companion, or lower, plate 10b. Each of plates 10a and 10b is of the same configuration, and each includes a corresponding outwardly-projecting portion 12. It should be understood that the various feel components now to be described are supported and positioned generally intermediate the two spaced-apart plates 10a and 10b, so that in one sense the structure 10 acts as a partial housing for the invention assembly.

A pair of bolts 14 and 16 are supported and positioned by the two plates 10a and 10b so as to extend therebetween. The bolt 14 carries in rotatable fashion thereon an arm 18 which may in some cases be designated hereinafter as a lock idler. The arm 18 extends in two opposite directions from the pivot bolt 14, and on one end of the arm is carried a roller 20 which is adapted to engage the cammed surface of a bellcrank the function of which will be hereinafter described. The other extremity of arm 18 is provided with a pin 22 to which is connected one end of a coil spring 24. The other end of spring 24 is secured to some fixed portion of the aircraft structure such, for example, as that on which the support member 10 is mounted.

Bolt 16, which is carried on the projecting portion 12 of the support member 10b (as well as on the corresponding projecting portion of member 10a) acts as a pivot point for a pair of bellcranks 26 and 28. Bellcrank 26 is of irregular outline, a portion of its periphery being designed in the shape of a "fish mouth" cam 29 into which the roller 20 carried by arm 18 is selectively receivable. Bellcrank 26 also has extending therefrom a curved leaf spring 30 the outer end of which is pivotally connected to an adjustable link 32. This same bellcrank 26 also supports and positions a pair of stops 34 and 36 respectively carried on two oppositely-disposed arms of the bellcrank.

The second bellcrank 28 is formed with three projecting arms 38, 40 and 42. Arm 38 is pivotally connected to a cable 44 which leads to the left-hand rudder pedal (not shown) of the aircraft. In similar fashion arm 40 is pivotally connected to a cable 46 leading to the right-hand rudder pedal (also not shown). The remaining arm 42 of bellcrank 28 is pivotally joined to a pushrod 48 which leads to the rudder power-control valve (not shown) through a primary feel system which may be identical to that shown in the above-mentioned Riccius patent. Arm 40, in addition to being pivotally connected to cable 46, also carries in pivotal fashion the extremity of the tie link 32 opposite to that joined to the leaf spring 30.

That end of the arm 18 which carries the roller 20 also has pivotally attached thereto a further cable 50 which leads to the wing structure (not shown) of the aircraft on which the invention device is installed, movement of cable 50 being in a direction generally similar (in the drawing) to that of the cables 44 and 46—that is, to the left or right as viewed therein.

It will be recalled that the auxiliary feel system which forms the subject of applicants' invention is intended, in the illustrated embodiment, to be incorporated into an aircraft having a wing which possesses a particular angle of incidence when the aircraft is traveling at normal speeds, and a different angle of incidence during a take-off or landing operation. It has been found that additional tension added to that developed by the basic feel structure is highly desirable at these normal speeds, but is not required at the speeds at which the aircraft is traveling when taking off or landing. Consequently, the apparatus herein disclosed is designed to have two sets of operating conditions, each of which is applicable to a particular flight environment.

Referring again to the drawing, it will be noted that the cable 50 leads to the aircraft wing structure. When the wing is "down" (or, in other words, in its "clean" condition for aircraft operation at normal speeds) then the arm 18 is in its location as shown in the drawing. In this position, roller 20 is urged into the recess defined by the adjacent curved surface portion of bellcrank 26. In other words, the tension of spring 24 tends to rotate arm 18 in a clockwise direction about the pivot point 14 and maintain the roller 20 in lockable engagement within the fish mouth cam 29 in bellcrank 26. It should be understood that the engaged condition of the arm 18 and bellcrank 26 as shown in the drawing constitute their relationship when the aircraft wing is in its "clean" or flight condition.

Under such circumstances, and with the rudder pedals in their neutral position, arm 40 of bellcrank 28 will lie in a position intermediate the two stop bolts 34 and 36. These two stop bolts 34 and 36 are "locked" in a fixed position relative to the support structure 10 (and hence relative to the aircraft fuselage) by means of the roller 20, which, as above brought out, is forced into the cam recess 29 in bellcrank 26 by the action of the engaging spring 24.

When the right-hand rudder pedal is subsequently moved forward of neutral, the right-hand rudder pedal cable 46 is pulled, and the bellcrank 28 rotates counterclockwise about the pivot bolt 16 until a pin 52 carried by the bellcrank arm 40 contacts the stop bolt 34. In one operating embodiment of the invention, it has been found preferable to set the space between the stop bolts 34 and 36 to correspond to a 6° angle of movement of the control surface, in this case the rudder. As the bellcrank 28 thus rotates, it pulls the pushrod 48 upwardly (in the drawing) to position the rudder power-control valve (not shown) through the primary feel system which is located between such valve and the auxiliary feel apparatus illustrated in the drawing.

In similar fashion, when the left-hand rudder pedal is moved forward of neutral, the left-hand rudder pedal cable 44 is pulled, and the bellcrank 28 rotates clockwise about the pivot bolt 16 until the pin 52 carried on the arm 40 contacts the stop bolt 36. The pushrod 48 is again moved as before, but now downwardly in the drawing. The rudder then moves to the left to yield the required directional aerodynamic force. It will be appreciated that any rotational movement of bellcrank 28 in either a clockwise or counterclockwise direction about the pivot bolt 16 will occur against the tension of the leaf spring 30 which is securely attached at one end to the bellcrank 26 as shown in the drawing. Since this bellcrank 26 does not move during the described flight operation, any rotation of bellcrank 28 must oppose the tension of the spring 30 as applied to the bellcrank 28 through the tie link 32. Thus, the force of this spring 30 is added to the force of the main feel spring (not shown) whenever the aircraft wing is in "clean" condition, and improves the pilot's sense of airfoil position under conditions of normal flight operation.

It will be noted that throughout the above-described actuation of the respective rudder pedal cables during the normal operation of the aircraft when the wing is in "clean" condition, no movement of the bellcrank 26 occurs, and the respective stops 34 and 36 remain fixed in position relative to the support member 10. If now the pilot of the aircraft wishes to engage in a landing operation (or to take off), it is desirable that the auxiliary force provided by the spring 30 be cut out of the linkage mechanism. This is accomplished in applicants' disclosure in automatic fashion as a function of a change in wing incidence. The cable 50, being connected to the wing structure as indicated, is moved to the left (in the drawing) when the wing is placed in position for take-off or landing. This movement of cable 50 to the left rotates arm 18 counterclockwise about pivot bolt 14 against the action of spring 24, and pulls the roller 20 from its position within the cammed recess 29 in bellcrank 26. The bellcrank 26 is thus placed in a condition where it may rotate freely in either direction about the pivot bolt 16, as shown by the arrows in the drawing.

Expressed in different fashion, when the wing is raised, movement of cable 50 to the left disengages the roller 20 carried by the locking idler arm 18 from its location within the "fish mouth" cam 29 of bellcrank 26. This "unlocks" the stops 34 and 36 carried by bellcrank 26, and permits such stops to move in arcuate fashion about the pivot bolt 16. Obviously, when the wing is again lowered to "clean" position, the spring 24 will reverse the above-described sequence, and the stops 34 and 36 will again be locked in position as a result of engagement between roller 20 and the cammed surface of bellcrank 26.

However, with the wing in "up," or landing position, and the roller 20 out of engagement with the bellcrank 26, movement of the right-hand rudder pedal forward of neutral will pull the cable 46 so that the entire assembly, consisting of both bellcranks 26 and 28, will rotate counterclockwise as a unit about the pivot bolt 16. The pushrod 48 will be actuated as before, but the distance through which the linkage travels is no longer limited by the stops 34 and 36, but only by the right-hand pedal stop itself (not shown). This is customarily set so that the control surface, in this case the rudder, moves through an angle of approximately 16°.

A corresponding effect is produced by movement of the left-hand rudder pedal forward of neutral, the cable 44 being pulled to rotate the entire assembly, consisting of both bellcranks 26 and 28, clockwise about the pivot bolt 16. It will be noted that in both of the described actions, no additional tension is imparted to the assembly by the spring 30, inasmuch as the bellcrank 26 to which the spring is attached rotates freely (as does the bellcrank 28) so that no relative angular movement is produced therebetween. Thus no auxiliary "feel" is added to the system during the "wing-up" flight condition.

As shown in the drawing, each of the stop bolts 34 and 36 is shown as being adjustable to limit the angle through which the bell crank 28 can rotate when the aircraft wing is in "down" position and the elements 20 and 29 have the relative positions shown in the drawing.

The tie bar 32 is also shown as being adjustable to eliminate any initial tension imparted to the spring 30 and consequently equalize the amount of auxiliary feel transmited to the aircraft pilot when either of the cables 44 or 46 is moved as a result of actuation of its respective rudder pedal.

Obviously many modifications and variations of the present invention are possible in the light of the above teachings. It is, therefore, to be understood that within the scope of the appended claims the invention may be practiced otherwise than as specifically described.

We claim:

1. For an aircraft having a linkage connecting a pilot's control element to a power control operable for deflecting an aerodynamic control surface of said aircraft, said aircraft being provided with a primary artificial feel mechanism for indicating to the pilot the position of said aerodynamic control surface at any given instant of time, the improvement which comprises an auxiliary artificial feel device supplementing said primary artificial feel mechanism and having an additive effect with respect thereto, said auxiliary artificial feel device including a support fixedly mounted on said aircraft structure, a first bellcrank pivotally carried by said support, a pushrod constituting a portion of said linkage and leading to the said primary feel mechanism, said pushrod being connected to a point on said first bellcrank, a pair of cables leading to the said pilot's control element, each cable of said pair being connected to a different point on said first bellcrank, whereby selective movement of one of said cables produces a rotation of said bellcrank in a direction dependent upon the particular cable so moved, a second bellcrank also pivotally carried by said support in coaxial fashion with said first bellcrank, means for releasably locking said second bellcrank in position to preclude rotation thereof, and a resilient member connecting said first and second bellcranks, whereby rotation of said first bellcrank in either direction in response to selective movement of said cables while said second bellcrank is locked in position will act to place said resilient member under a degree of tension determined by the angle through which such rotation of said first bellcrank occurs.

2. The combination of claim 1 in which said second bellcrank is formed with a cam recess therein, and in which said means for releasably locking said second bellcrank in position to preclude rotation thereof includes an idler arm pivotally carried by said support, said idler arm being provided with a roller, and means for urging said roller into the cam recess formed in said second bellcrank.

3. The combination of claim 2 in which said last-mentioned means includes a coil spring one end of which is connected to said idler arm and the other end of which is fixedly secured to the structure of said aircraft.

4. The combination of claim 2 in which said first bellcrank is provided with a stop pin, and in which said second bellcrank carries thereon a pair of stop elements disposed on opposite sides of the stop pin carried by said first bellcrank and designed to be selectively contacted by such stop pin upon a rotation of said first bellcrank through a predetermined angle in either direction from an intermediate position with respect to said second bellcrank.

5. The combination of claim 2 in which said resilient member comprises a leaf spring one end of which is rigidly attached to said second bellcrank, and means for pivotally connecting the opposite end of said leaf spring to a point on said first bellcrank.

6. For an aircraft having a variable-incidence wing and a linkage connecting a pilot's control element to a power control operable for deflecting an aerodynamic control surface of said aircraft, said aircraft being provided with a primary artificial feel mechanism for indicating to the pilot the position of said aerodynamic control surface at any given instant of time, the improvement which comprises an auxiliary artificial feel device supplementing said primary artificial feel mechanism and having an additive effect with respect thereto, said auxiliary artificial feel device including a support rigidly mounted on said aircraft, a first bellcrank pivotally carried by said support, a pushrod constituting a portion of said linkage leading to the said primary artificial feel mechanism, said pushrod being connected to a point on said first bellcrank, a pair of cables leading to the said pilot's control element, each cable of said pair being connected to a different point on said first bellcrank, whereby selective movement of one of said cables produces a rotation of said bellcrank in a direction dependent upon the particular cable so moved, a second bellcrank also pivotally carried by said support in coaxial fashion with said first bellcrank, means for releasably locking said second bellcrank in position to preclude rotation thereof, a resilient member connecting said first and second bellcranks, whereby rotation of said first bellcrank in either direction in response to selective movement of said cables while said second bellcrank is locked in position will act to place said resilient member under a degree of tension determined by the angle through which such rotation of said first bellcrank occurs, and means connected to the wing of said aircraft and responsive to a variation in the incidence of such wing for releasing said second bellcrank from its locked position and permitting such second bellcrank to rotate as a unit with said first bellcrank upon movement of either one of said pair of cables, the release of said second bellcrank from its locked position also acting to preclude the development of tension in said resilient member during such a unitary rotation of said two bellcranks.

7. The combination of claim 6 in which said second bellcrank is formed with a cam reces therein, and in which said means for releasably locking said second bellcrank in position to preclude rotation thereof includes an idler arm pivotally carried by said support, said idler arm being provided with a roller, and means for urging said roller into the cam recess formed in said second bellcrank, and in which said means connected to the wing of said aircraft and responsive to a variation in the incidence of such wing includes a further cable leading from such wing and connected to said idler arm, a movement of such further cable upon a selective change in the incidence of said wing acting to rotate said idler arm and draw said roller out of the cam recess formed in said second bellcrank.

References Cited in the file of this patent

UNITED STATES PATENTS

| | | |
|---|---|---|
| 2,143,271 | Jay | Jan. 10, 1939 |
| 2,684,215 | Ashkenas | July 20, 1954 |
| 2,881,631 | Riccius | Apr. 14, 1959 |